United States Patent [19]

Thepault

[11] 4,417,635
[45] Nov. 29, 1983

[54] RAPID FIXING DEVICE CONSISTING OF A SPRING UNIT

[75] Inventor: Yves Thepault, Velizy, France

[73] Assignee: Regie Nationale des Usines Renault, Boulogne-Billancourt, France

[21] Appl. No.: 294,217

[22] Filed: Aug. 19, 1981

[30] Foreign Application Priority Data

Aug. 22, 1980 [FR] France ................... 80 18384

[51] Int. Cl.$^3$ ............................................. B60K 11/04
[52] U.S. Cl. ................................ 180/68 R; 248/509; 248/503; 24/3 J; 24/458
[58] Field of Search ....... 24/261 R, 225 R, 3 D–3 M, 24/159, 162, 215, 213 LS; 267/58, 154–155; 248/634, 503, 509, 232; 180/68 R, 68.5; 16/85

[56] References Cited

U.S. PATENT DOCUMENTS

| 323,262 | 7/1885 | Blinzler | 24/261 R |
|---|---|---|---|
| 2,881,721 | 3/1959 | Hyland | 267/155 |
| 3,333,810 | 8/1967 | Schlapman | 180/68.5 |
| 3,700,061 | 10/1972 | Hortnagl | 180/68 R |
| 4,083,312 | 4/1978 | Holman | 24/215 |
| 4,121,682 | 10/1978 | Schaal et al. | 180/68 R |
| 4,196,774 | 4/1980 | Hoffmann | 180/68 R |

FOREIGN PATENT DOCUMENTS

2634990  2/1978  Fed. Rep. of Germany .... 180/68 R

*Primary Examiner*—Robert P. Swiatek
*Assistant Examiner*—John Weiss

*Attorney, Agent, or Firm*—Oblon, Fisher, Spivak, McClelland & Maier

[57] ABSTRACT

An arrangement for mounting a cooling system radiator in the engine compartment of an automobile vehicle, the radiator including a base portion and a top portion and the engine compartment including a beam structure having a horizontal bottom beam member for supporting and positioning the base portion of the radiator, a horizontal top beam member and a horizontal intermediate stiff beam member, the top and intermediate beam members being transversely offset on the same side with respect to the bottom beam member, the arrangement further including a one-piece spring wire unit having a first and second leg connected together at one end thereof so as to extend substantially perpendicular to one another when the spring wire unit is not strained, the spring wire unit being mounted under strain so that the first leg extends from a connection with a second leg from above the top beam member substantially horizontally over the radiator, a free end of the first leg being pressed downwardly on the top portion of the radiator, the second leg extending from a connection with the first leg from above the top beam member substantially vertically downwardly through the top beam member while being movable and guided vertically in the top beam member, wherein a free end of the second leg further includes a mechanism for fixing the free end of the second leg to the spring wire unit so as to transfer to the intermediate beam the impression force supplied by the free end of the first leg of the spring wire unit to the top portion of the radiator.

17 Claims, 2 Drawing Figures

RAPID FIXING DEVICE CONSISTING OF A SPRING UNIT

BACKGROUND OF THE INVENTION

1. Field of the Invention

The present invention relates to a device for positioning and maintaining a part with respect to a surrounding beam structure, particularly for the speedy assembly and disassembly of an engine-cooling radiator of an automotive vehicle on the metal members of the engine compartment.

2. Description of the Prior Art

More often than not the radiator is positioned and supported on a bottom beam or member by means of locating studs and elastic pads, then it is fixed on a top member, that is offset transversally from the bottom member, by means of a connecting piece bolted onto the top member and supported by the top of the radiator, with another elastic pad being placed in between and exerting a large enough vertical pressure on the radiator to make sure it is effectively held in position.

But this assembly is time consuming and inconvenient due to the need to keep the radiator pressed down while the fixing piece is bolted. Further, it is necessary to adjust the position of the connecting piece, for example by means of U-slots and packing pieces to take up the many dimensional variations due to the manufacture of both the radiator and its surroundings.

Adjustment is all the more difficult, the more rigid the top member. Thus the pressure exerted by the radiator is likely to be absorbed by a corresponding torsion in the member.

Another solution consists in fixing the radiator to the bottom member, after it has been positioned with respect to the top member. But this time accessibility is more awkward and the bolting and adjustment take even longer.

SUMMARY OF THE INVENTION

The aim of the invention is to counteract the preceding drawbacks with a device for the rapid positioning and holding under pressure of a part with respect to a structure of surrounding beams or members between which the part has to be held, both at its base supported by a bottom member and at its top with respect to a top member transversally offset from the bottom member, given that the top member cannot be used to take up the torque transmitted by the fixing component.

Another object of the invention is to provide a screwless fast assembly device able to automatically accommodate the various manufacturing dimension ranges.

To fulfill this purpose a one-piece unit made of spring wire, is provided passing through the top member and fixed to an intermediate member located vertically between the other two; the spring is shaped so as to transfer the compressive force exerted over the part being held to the stiffer intermediate member.

The spring comprises a first fixing leg for fast flexible fixing onto the intermediate member and an elastic leg approximately perpendicular to the first fixing leg and connected to it by a spring section compressing the part being held.

The first fixing leg passes through the top member without subjecting it to any twisting, so that the stresses are taken up by the stiffer intermediate member which acts as the support.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
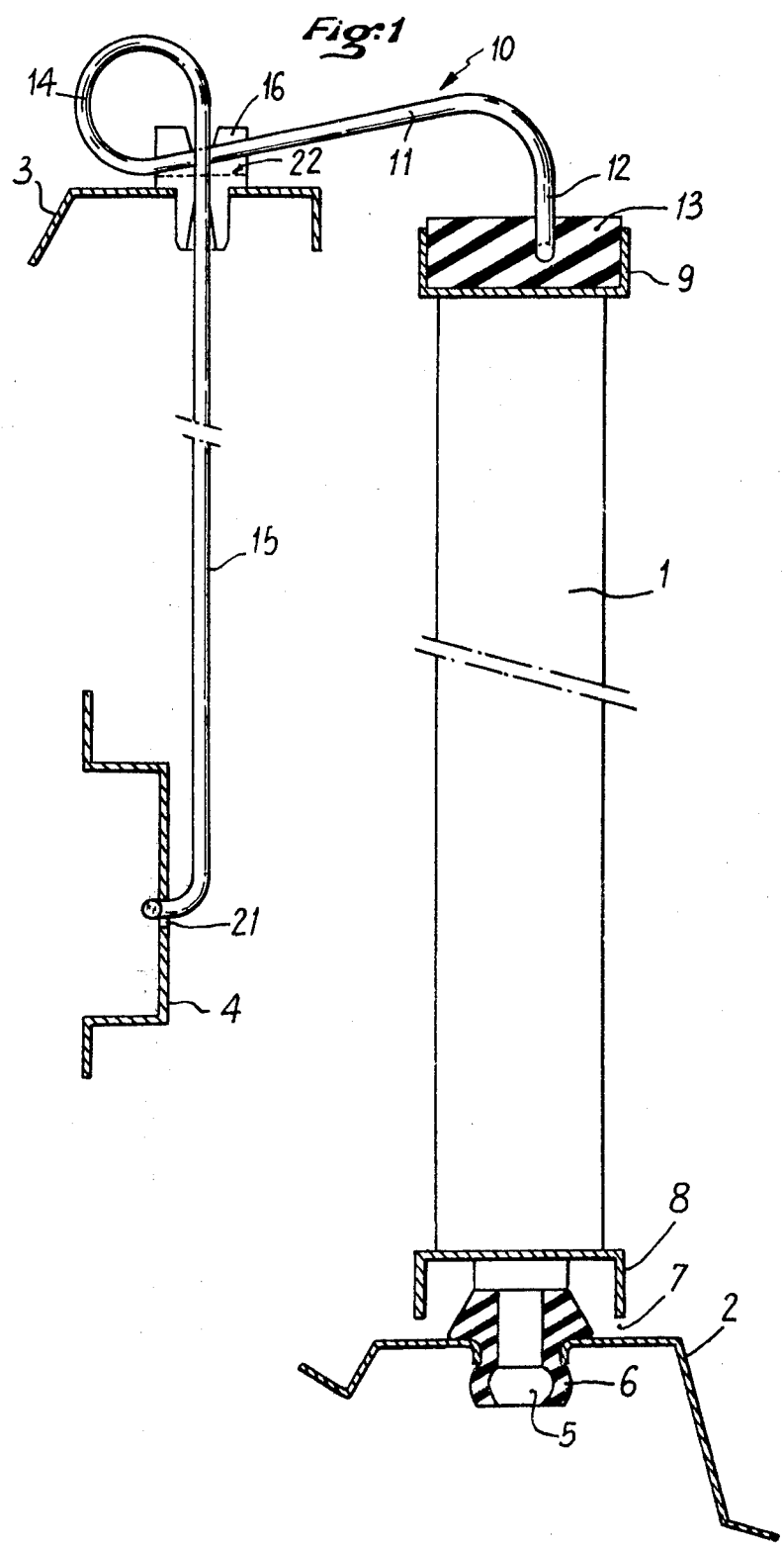
FIG. 1 is a section view of the device applied to holding a vehicle radiator.

FIG. 1 shows an automotive vehicle engine cooling system radiator 1 that is to be installed inside the engine compartment and surrounded by cross members or metal beams like a bottom member 2, a top member 3 offset transversally from the first member and an intermediate member 4 located vertically between the other two members 2 and 3 at the level of the grill, which is not shown.

The radiator 1 rests in a known manner on the bottom member 2 by means of studs 5 clipped into the member 2 with a first rubber elastic pad 6 inserted to form a stop so that a clearance 7 is left between the base 8 of the radiator and the members. This system enables the radiator to be located and fixed rapidly to the least accessible member for assembly.

According to the invention the top 9 of the radiator is held vertically under pressure by means of a wire spring unit 10 comprising an elastic holding leg 11 ending in a hook shaped portion 12 bearing against the top 9 of the radiator through a second elastic pad 13, with a full or partial spring turn 14, and a fixing leg 15 approximately at right angles to the holding leg 11 which passes unrestricted through the top member 3 guided by a clip 16 and also hooks onto the intermediate member 4 located beneath the top member, vertically below the clip hole designed for the passage of the fixing leg 15.

Figure 2:
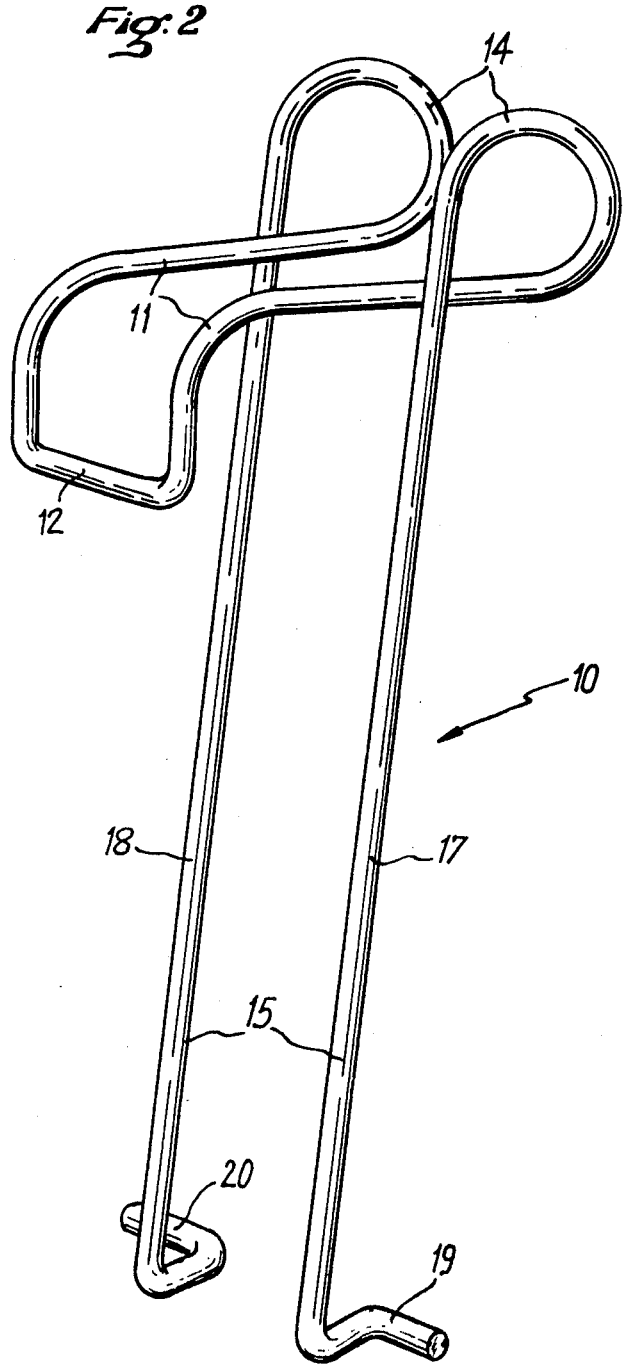
FIG. 2 gives a perspective view of the spring unit.

FIG. 2 illustrates the shape configuration of the single-piece spring unit 10 including a first or an "out" wire 17 and a second or "back" wire 18 parallel to the "out" wire. The free ends of the unit form the end of the fixing leg 15, handled like a spring grip by pressing together the two strands, the ends 19, 20 of which are bent successively in two perpendicular planes to form elements hooking into a hole 21 in the intermediate member 4 and bearing against the sides of this hole.

The holding leg hook 12, to compress the radiator, transmits the elasticity of the spring turn 14, and joins the "out" wire 17 and the "back" wire 18; the constant gap between the two wire strands 17, 18 is determined by the width of the hook 12 and is maintained by the clip 16 providing guidance when the wire strands 17, 18 pass through the top member 3.

The clip can be pre-assembled on the spring unit and then clipped into the appropriate opening in member 3. It has grooves 22 on top which support the spring turns 14 and the strands 11 of the holding leg and take up and transmit the compressive stress to the fixing leg 15 while eliminating the torsion moment in the top member and only applying a shear stress to this member in the direction of its greatest inertia. The intermediate member 4 then bears all the large stresses.

Furthermore, the elasticity of the holding leg 11 enables the radiator 1 to be installed speedily and the manufacturing variations to be absorbed at the same time as exerting a sufficient vertical force on the radiator.

The invention is not limited to the embodiment described but also covers all simple technical equivalents and may be applied to hold any part whatsoever the fixing of which gives rise to the difficulties encountered above.

I claim:

1. An arrangement for mounting a cooling system radiator in the engine compartment of an automobile vehicle, said radiator comprising a base portion and a top portion and said engine compartment comprising a beam structure including a horizontal bottom beam member for supporting and positioning said base portion of said radiator, a horizontal top beam member and a horizontal intermediate stiff beam member, said top and intermediate beam members being transversely offset on the same side with respect to said bottom beam member, said arrangement comprising:
   a one-piece spring wire unit including a first leg and a second leg connected together at one end thereof so as to extend substantially perpendicular to one another when the spring wire unit is not strained, said spring wire unit being mounted under strain so that said first leg extends from a connection with said second leg from above said top beam member substantially horizontally over said radiator, a free end of said first leg being pressed downwardly on said top portion of said radiator, and said second leg extending from a connection with said first leg from above said top beam member substantially vertically downwardly through said top beam member while being movable and guided vertically in said top member, wherein a free end of said second leg further comprises means for fixing the free end of said second leg to said spring wire unit so as to transfer to said intermediate beam member a compression force supplied by the free end of the first leg of the spring wire unit to the top portion of the radiator.

2. The arrangement according to claim 1, wherein said spring wire unit further comprises a loop portion connecting said first leg to said second leg.

3. The arrangement according to claim 1, wherein said bottom beam member includes at least one radiator positioning hole formed therein and said base portion of the radiator further comprises at least one stud surrounded by an elastic member, said elastic member being partly engaged with said hole and partly supported by said bottom beam member around said hole.

4. The arrangement according to claim 1, wherein said top portion of said radiator further comprises an elastic pad on which is pressed the free end of said first leg of said spring wire.

5. The arrangement according to claim 1, said intermediate beam member having a hole formed therein wherein said spring wire unit further comprises first and second parallel wire portions each of which includes a first and second leg wherein free ends of the first legs are connected together and free ends of the second legs further comprise an opposite bent hook-shaped portion for hooking said free ends into said hole formed in said intermediate beam member.

6. The arrangement according to claim 5, wherein said free ends of the first legs further comprises bent free ends so as to be hook-shaped at a connection portion thereof bearing against the top portion of the radiator.

7. The arrangement according to claim 5, further comprising a clip mounted on said top beam member through which passes said second legs of said spring wire unit such that said clip provides vertical guidance of said second legs of said spring wire unit.

8. An arrangement for mounting a cooling system radiator in the engine compartment of an automobile vehicle, said radiator comprising a base portion and a top portion and said engine compartment comprising a beam structure including a horizontal bottom beam member for supporting and positioning said base portion of said radiator, a horizontal top beam member and a horizontal intermediate stiff beam member, said top and intermediate beam members being transversely offset on the same side with respect to said bottom beam member, said arrangement comprising:
   a one-piece spring wire unit including a first leg and a second leg connected together at one end thereof so as to extend substantially perpendicular to one another when the spring wire unit is not strained, said spring wire unit being mounted under strain so that said first leg extends from a connection with said second leg from above said top beam member substantially horizontally over said radiator, a free end of said first leg being pressed downwardly on said top portion of said radiator, and said second leg extending from a connection with said first leg from above said top beam member substantially vertically downwardly through said top beam member while being movable and guided vertically in said top member, wherein a free end of said second leg further comprises means for fixing the free end of said second leg to said spring wire unit so as to transfer to said intermediate beam member a compression force supplied by the free end of the first leg of the spring wire unit to the top portion of the radiator and wherein said spring wire unit further comprises a loop portion connecting said first leg to said second leg.

9. The arrangement according to claim 8, wherein said bottom beam member includes at least one radiator positioning hole formed therein and said base portion of the radiator further comprises at least one stud surrounded by an elastic member, said elastic member being partly engaged with said hold and partly supported by said bottom beam member around said hole.

10. The arrangement according to claim 8, wherein said top portion of said radiator further comprises an elastic pad on which is pressed the free end of said first leg of said spring wire unit.

11. The arrangement according to claim 8, said intermediate beam member having a hole formed therein wherein said spring wire unit further comprises first and second parallel wire portions each of which includes a first and second leg wherein free ends of the first legs are connected together and free ends of the second legs further comprise an opposite bent hook-shaped portion for hooking said free ends into said hole formed in said intermediate beam member.

12. The arrangement according to claim 11, wherein said free ends of the first legs further comprises bent free ends so as to be hook-shaped at a connection portion thereof bearing against the top portion of the radiator.

13. The arrangement according to claim 9, further comprising a clip mounted on said top beam member through which passes said second legs of said spring wire unit such that said clip provides vertical guidance of said second legs of said spring wire unit.

14. An arrangement for mounting a cooling system radiator in the engine compartment of an automobile vehicle, said radiator comprising a base portion and a top portion and said engine compartment comprising a beam structure including a horizontal bottom beam member for supporting and positioning said base portion of said radiator, a horizontal top beam member and a horizontal intermediate stiff beam member, said top and intermediate beam members being transversely offset on the same side with respect to said bottom beam member, said arrangement comprising:

a one-piece spring wire unit including a first leg and a second leg connected together at one end thereof so as to extend substantially perpendicular to one another when the spring wire unit is not strained, said spring wire unit being mounted under strain so that said first leg extends from a connection with said second leg from above said top beam member substantially horizontally over said radiator, a free end of said first leg being pressed downwardly on said top portion of said radiator, and said second leg extending from a connection with said first leg from above said top beam member substantially vertically downwardly through said top beam member while being movable and guided vertically in said top member, wherein a free end of said second leg further comprises means for fixing the free end of said second leg to said spring wire unit so as to transfer to said intermediate beam member a compression force supplied by the free end of the first leg of the spring wire unit to the top portion of the radiator;

said intermediate beam member having a hole formed therein wherein said spring wire unit includes first and second parallel wire portions each comprising a first and second leg, the free ends of the first legs being connected together and the free ends of the second legs having an opposite bent hook-shaped portion for hooking said free ends into said hole formed in said intermediate beam member, free ends of said first legs including bent first legs so as to be hook-shaped at a connection portion bearing against the top portion of the radiator; and wherein said spring wire unit further comprises a loop portion connecting said first leg to said second leg.

15. The arrangement according to claim 14, wherein said bottom beam member includes at least one radiator positioning hole formed therein and said base portion of said radiator further comprises at least one stud surrounded by an elastic member, said elastic member being partly engaged with said radiator positioning hole and partly supported by said bottom beam portion around said radiator positioning hole.

16. The arrangement according to claim 14, wherein said top portion of said radiator further comprises an elastic pad on which is pressed the free end of said first leg of said spring wire unit.

17. The arrangement of claim 14, further comprising a clip mounted on said top beam member through which passes said second legs of said spring wire unit such that said clip provides vertical guidance of said legs of the spring wire unit.

* * * * *